Oct. 9, 1956  F. RECK  2,765,684
MEANS FOR STRIPPING INSULATED WIRE
Filed Oct. 26, 1953.  2 Sheets-Sheet 1
FIG. 1
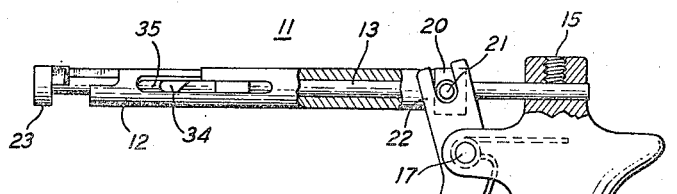
FIG. 2
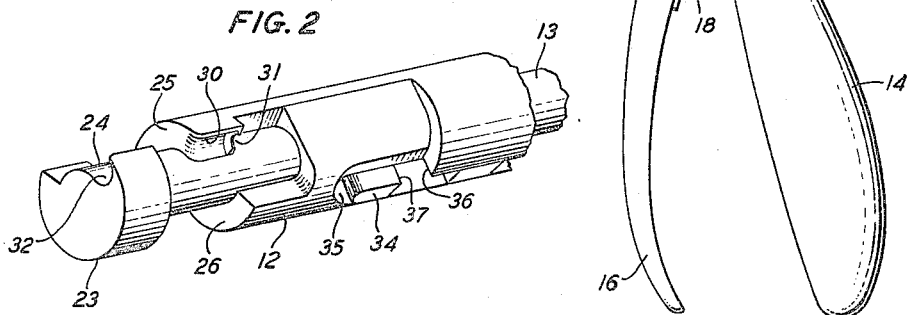
FIG. 3  FIG. 4  FIG. 5  FIG. 6
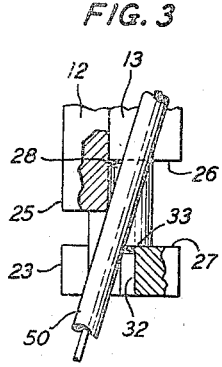 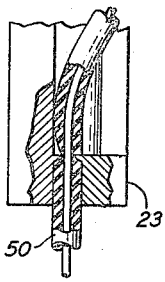 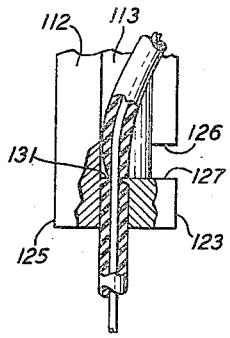 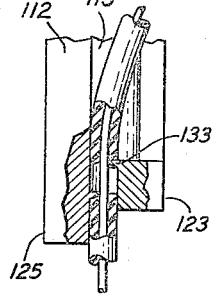
FIG. 7
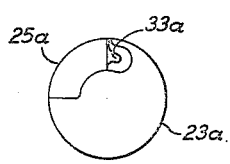
INVENTOR
F. RECK
BY John C. Morris
ATTORNEY

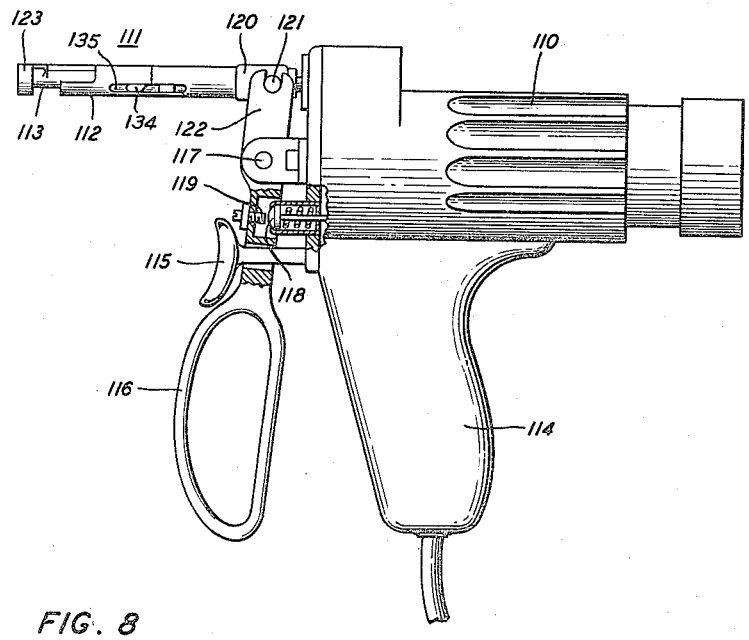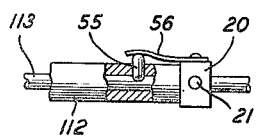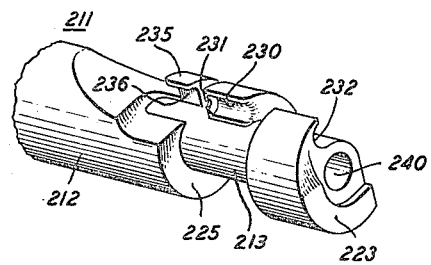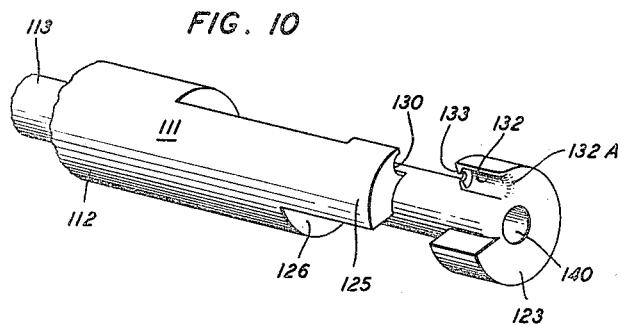

United States Patent Office 2,765,684
Patented Oct. 9, 1956

2,765,684

MEANS FOR STRIPPING INSULATED WIRE

Frank Reck, Flushing, N. Y., assignor to Bell Telephone Laboratories, Incorporated, New York, N. Y., a corporation of New York Application October 26, 1953, Serial No. 388,082

10 Claims. (Cl. 81—9.5)

This invention relates to wiring tools and more particularly to such tools including means for cutting an insulated wire to a specified length and for stripping the insulation from a portion thereof.

Devices of the general type of which this invention pertains are disclosed in the application of Herman A. Miloche, Serial No. 234,641, filed June 30, 1951, now Patent No. 2,682,063, issued June 29, 1954, and the application of the present applicant, Frank Reck, Serial No. 234,643, also filed June 30, 1951, now Patent 2,743,502, issued May 1, 1956. In the noted applications, means for cutting the wire and for mutilating the insulation in preparation for stripping are combined with means for wrapping the stripped wire on a terminal in what has been called a combination wire wrapping tool. The means of the present invention may also be used in a combination wire wrapping tool or may be used in a tool for cutting and stripping an insulated wire in preparation for performing other operations thereon.

An object of this invention is to facilitate the preparation of an insulated wire for making a connection to a suitable terminal.

A further object of this invention is to simplify the structure of a wire stripping tool and to improve its operation.

A feature of this invention resides in cooperative elements of a wire handling tool that will cut the insulation of a wire in preparation for stripping, by a relative longitudinal movement of the elements.

A further feature of this invention lies in a construction and arrangement of the insulation cutting elements that allows the parts of the cut insulation to be slightly separated prior to actual stripping.

Another feature resides in means for guiding the wire into the insulation cutting means during stripping.

Other and further objects and features of this invention will appear more fully and clearly from the following description of illustrative embodiments thereof taken in connection with the appended drawings in which:

Fig. 1 is an elevational view of a tool embodying the invention, with parts sectioned to show details of construction;

Fig. 2 is a perspective view of a portion of the tool bit of Fig. 1;

Figs. 3 and 4 are fractional views of the outer end of the tool bit of the Fig. 1 tool showing respectively two aspects of operation, parts of the tool being broken away to shown details of construction;

Figs. 5 and 6 are fractional views of the outer end of a tool bit for a modified tool, in some ways similar to that of Fig. 1, showing respectively two aspects of operation, parts of the tool being broken away to show constructional details;

Fig. 7 is an end view of a tool bit illustrating another embodiment of this invention;

Fig. 8 is a fractional view of a portion of a tool bit showing a detent means for use with the bit shown in Figs. 5 and 6;

Fig. 9 is an elevational view of a motor driven wire wrapping tool having a bit of the type disclosed in Figs. 5, 6 and 10;

Fig. 10 is a perspective view of a portion of the tool bit of Figs. 5, 6 and 9; and Fig. 11 is a perspctive view of a portion of a tool bit illustrative of another embodiment of the invention.

As shown in Fig. 1, the wire cutting and insulation stripping tool of this invention comprises a bit 11 including a sleeve 12 and a spindle or shaft 13. The spindle 13 is secured at its inner end at the top of a handle or grip 14 by suitable means such as the set screw 15.

The sleeve 12 is mounted for longitudinal movement on the spindle 13, said movement being imparted by means of the lever 16, which is pivoted on the handle 14 by a pin or like means 17. The lever 16 is shown in Fig. 1 in its retracted position from which it may be biased by the spring 18.

The sleeve 12 is provided at its inner end with a crosshead 20 having pins 21 (one only of which is shown) embraced by the bifurcated ends 22 of the lever 16. On the outer end of the spindle 13 is an enlargement or head 23, which among other things, limits the forward movement of the sleeve 12. The head 23 is cut away at 24 (see Fig. 2) to receive a projecting portion 25 of the outer end of the sleeve 12. An end surface 26 of the sleeve 12 abuts the rear surface 27 of the head 23 when the sleeve is in the forward position.

One side of the projection 25 of the sleeve includes a longitudinal notch 30 provided at its inner end with an insulation cutting jaw 31. The head 23 at one side of the cut away portion 24 includes a longitudinal notch 32. The notch 32 has at its inner end an insulation cutting jaw 33. The notch 32 and the jaw 33 are respectively mirror images of the notch 30 and the jaw 31 and are substantially like the notch 132 and the jaw 133 of Fig. 10. Thus when the sleeve 12 is in its forward position with the surfaces 26 and 27 in contact as shown in Figs. 1 and 4, there is provided a longitudinal passage for embracing an insulated wire, with a pair of insulation cutting jaws in insulation severing position.

The spindle 13 is provided with a projection 34 and the sleeve 12 with a slot 35 in which the projection slides when there is relative longitudinal movement between the sleeve and the spindle. A shoulder 36 on the sleeve 13 and an edge 37 on the rear of the projection 34 comprise a shear for cutting to suitable length, upon forward movement of said sleeve, a wire inserted therebetween when the sleeve was in its rearward position.

With the never 16 released and the sleeve 12 thus biased to the rearward position by the spring 18, the parts of the bit are as shown in Figs. 2 and 3. An insulated wire 50 may be laid in the space between the notch 30 in the head 23 and the notch 32 in the projection 25, which are now in longitudinally offset relation. The end of the wire 50 may be positioned for cutting by placing it between the edge 37 of the projection 34 and the shoulder 36. The lever 16 is pulled to advance the sleeve 12 juxtaposing the notches and embracing the wire 50 between them. The insulation cutting jaws 31 and 33 mate and sever the insulation and the shear cuts the wire to length. The wire 50 may now be pulled from the tool, leaving the severed insulation therein. When the lever 16 is released the stripped portion of insulation may be removed and the tool is ready for the next operation.

In the modification illustrated in Figs. 5, 6 and 10 the surface 126 is a short distance further back than the corresponding surface 26 of the previously described modification. Thus the sleeve after coming to the position of Fig. 5 to sever the insulation, may be advanced to the position of Fig. 6. This additional movement pulls the insulation apart slightly.

The bit illustrated in Figs. 5, 6 and 10 is similar to the one shown in Figs. 1 to 4 inclusive, except for the noted difference between the locations of the surfaces 126 and 26 and the provision of a terminal receiving orifice 140 in the end of the head 123. The notch 132 and the cutting jaw 133, best seen in Fig. 10, correspond respectively to the notch 32 and the jaw 33 of the tool shown in Figs. 1 to 4 inclusive. The notch 130 and the jaw 131 on the projection 125 in like manner correspond respectively to the notch 30 and the jaw 31 of Figs. 1 to 4 inclusive.

If the bit structure of Figs. 5, 6 and 10 is used in place of that shown in Fig. 1, a detent to aid in relocating the sleeve 112 to the position of Fig. 5 after parting of the insulation may be provided. The detent pin 55 loaded by the spring 56, as shown in Fig. 8, is adapted to fit in a depression in the spindle 113. The depression is located so that the pin is seated therein when the sleeve and spindle are in the relative positions shown in Fig. 5. This construction coupled with the positioning of the face 126 allows the sleeve to be advanced to the position of Fig. 6, but locates the sleeve in the position of Fig. 5 when pressure on the lever 116 is slightly relaxed.

If desired and where the type of insulation allows, the insulation cutting jaw and the longitudinal notch on the sleeve 12 may be omitted. For example, as shown in Fig. 7, the head 23a has an insulation cutting jaw 33a somewhat deeper than the corresponding cutting jaws 33 or 133 of the other embodiment. The projection 25a may have a generally flat surface facing the jaw 33a, which surface forces the wire into the jaw 33a when the sleeve 12 is moved forward. Such a device will cut the insulation on one side of the wire leaving the remainder to be torn apart during stripping. This device would be somewhat easier and cheaper to manufacture and would be quite satisfactory for use with insulation materials that would tear rather easily after a partial cutting.

As has been indicated, a bit of the type herein contemplated may be used on a wire wrapping tool. For such use the bit may be incorporated in a wire wrapping tool such as that shown in Fig. 9. This tool, except for the improvements of this invention, is like that disclosed in the noted application, Serial No. 234,643 of the present applicant. The bit may be of the type shown in Figs. 1 to 4 inclusive but having a terminal receiving orifice such as 140 of Fig. 10, or as is shown in Fig. 9, of the type shown in Figs. 5, 6 and 10.

The wire wrapping tool comprises a housing 110 on which is mounted the wiring bit 111 including a sleeve 112 and a spindle 113. The housing is provided with a grip or handle 114, a wrapping control member or trigger 115, and an operating lever 116. The lever 116 is pivoted to the housing at 117 and operates the sleeve 112 longitudinally on the spindle 113 by way of the crosshead 120, the pins 121, and the bifurcated ends 122 of the lever.

The bit 111 of this device is mounted for rotation by driving means in the housing 110 to wrap a wire on a terminal to which it is applied. In order to adapt the bit of this tool for wire wrapping there is provided in the end of the head 123 the terminal receiving orifice 140 shown in Fig. 10.

The spindle 113 is provided with a projection 134 and the sleeve 112 with a slot 135 in which the projection slides when there is relative longitudinal movement between the sleeve and the spindle. A shoulder on the sleeve 113 and an edge on the rear of the projection 134, corresponding respectively to the shoulder 36 and the edge 37 of Fig. 2, comprise a shear for cutting the wire upon a forward movement of the sleeve, as previously discussed with respect to the tool of Figs. 1 to 4, inclusive.

To perform a wire wrapping operation, the tool is loaded with an insulated wire and a terminal is inserted in the orifice 140. The tool is operated to cut the wire to proper length and to mutilate the insulation by manipulation of the lever 116. The trigger 115 is then pressed to initiate the wrapping operation. A description of the wire preparing operations is included in the subsequent description of the means employed.

Attached to the housing 110 in the path of the lever 116 is a spring loaded stop 118, which in the retracted position of the lever is in contact with an adjustable member 119 on the lever. The parts are adjusted so that when the member 119 is just in contact with the stop 118 the projection 125 and the head 123 of the bit are in the relative positions shown in Fig. 5 and the insulation is severed. Further movement of the lever 116 is against the spring loaded stop 118 and moves the projection 125 to the position of Fig. 6 parting the insulation. A slight relaxation of the pressure on the lever 116 allows the stop 118 to assume its normal position, moving the lever outwardly so that the parts are back to the position shown in Fig. 5, but with the insulation now parted. The trigger 115 is then pressed to initiate the wire wrapping operation during which the wire is pulled out of the severed insulation, which remains in the tool until the jaws are reopened.

As shown in Fig. 10 the notch 132 is provided at its outer end with a flared surface or radius 132a over which the bared wire is drawn during its wrapping on a terminal.

When tool bits of this type are used in a wire wrapping tool such as that of Fig. 9 it is advantageous to have wire guiding means behind the insulation cutting jaws as well as in front. This may be done by making the notches 130 and 132 somewhat longer and locating the cutting jaws 131 and 133 the same distance from the outer ends of the head 123 and the projection 125 as in the bit of Fig. 10. Then the parts of the notches behind the cutting jaws will serve as the additional guide means. The purpose of this wire guiding means behind the cutting jaws is to line the wire up with the wire embracing orifice defined by the notches 130 and 132 when closed. By guiding the wire in this manner additional friction during the wrapping and stripping operation is avoided. If the wire is not so guided it may, because of the centrifugal force due to the rotating bit or to other causes, deviate sufficiently to cause it to enter the cutting jaws from the side. Drawing the wire across an edge due to the noted deviation may increase the friction sufficiently to cause wire breakage.

As may be seen in Fig. 11 the wire may be guided behind the cutting jaws by a hook or projection behind said jaws.

The bit of Fig. 11 is similar to that of Fig. 10, but is designed for wire wrapping rotation in the opposite direction and has the noted additional wire guiding means. This bit 211 comprises a sleeve 212 around a spindle 213. The spindle has a head 223 provided with a terminal orifice 240, a notch 232 and a cutting jaw, not shown but corresponding to the jaw 133 of Fig. 10. The sleeve 212 has a projection 225 including the notch 230 and the cutting jaw 231. These parts correspond respectively to similar parts 12, 13, etc., 112, 113, etc. of the previously described bits.

Back of the cutting jaw 231 is a hook or extension 235 defining an additional notch or guideway 236 in line with the cutting jaw and the forward notch 230. The wire being stripped and wrapped is guided by the notch 236 to enter the juxtaposed cutting jaws 231 and 233 substantially in line therewith.

The bits of this invention which are for use in wire wrapping tools may be made for either clockwise or counterclockwise rotation by reversal of the various parts. The direction of rotation will ordinarily be dictated by the use to which the device is put.

In order to review the operation of a wire wrapping tool, including the improvement of this invention, e. g., the tool of Fig. 9, the connection of a wire having one end already connected to another terminal may be taken as exemplary. The operator, having directed the wire to the terminal, lays it between the presently separated longitudinal grooves of the sleeve and spindle, respectively (as illustrated in Fig. 3), and into the wire cutter, and applies the terminal receiving orifice to the terminal. The wire placing and tool applying operations may be performed substantially simultaneously or either before the other. With the tool thus conditioned, movement of the operating lever to contact with the biased stop causes the sleeve to slide forward on the spindle, cutting the wire to length and severing the insulation. A slight further movement of the lever against the bias of the stop parts the insulation. After a slight retrograde movement of the lever, due to relaxation of the pressure thereon and the biasing effect of the stop, the trigger is operated. The consequent rotation of the tool bit pulls the wire out of the severed insulation and simultaneously wraps it on the terminal. Release of the lever and trigger and removal of the tool from the terminal completes the operation, allowing the tool parts to return to the initial condition and the stripped insulation to be dropped out.

What is claimed is:

1. An insulation stripping means for embracing an insulating wire and cutting the insulation thereof, comprising a shaft, a sleeve around said shaft and longitudinally movable with respect thereto, an enlarged head on the outer end of the shaft, said head having a generally longitudinal wire receiving notch including an insulation cutting jaw, the outer end of said sleeve adjacent the shaft head being formed to define a generally longitudinal surface substantially parallel to and facing the notch in the shaft head, means for moving the sleeve to a retracted position in which said surface and notch are longitudinally offset and for moving the sleeve to an advanced position to juxtapose said longitudinal surface and notch, to cut the insulation of a wire embraced between the surface and the notch.

2. An insulation stripping means as in claim 1 in which the longitudinal surface on the outer end of the sleeve includes a longitudinal notch with an insulation cutting jaw to mate with the longitudinal notch and the insulation cutting jaw on the shaft head when the surface and the notch are juxtaposed.

3. An insulation stripping means as in claim 1 in which the outer end of the sleeve includes a shoulder to abut the inner face of the enlarged head to limit the forward movement of the sleeve.

4. An insulation stripping means as in claim 2 in which the outer end of the sleeve includes a shoulder to abut the inner face of the enlarged head to limit the forward movement of the sleeve.

5. An insulation stripping means as in claim 3 in which the shoulder on the sleeve abuts the inner face of the head when the notches are in juxtaposition.

6. An insulation stripping means as in claim 4 in which the shoulder on the sleeve abuts the inner face of the head when the notches are in juxtaposition.

7. An insulation stripping means as in claim 3 in which the shoulder on the sleeve abuts the inner face of the head when the notches are offset with the sleeve notch forward of the shaft notch.

8. An insulation stripping means as in claim 4 in which the shoulder on the sleeve abuts the inner face of the head when the notches are offset with the sleeve notch forward of the shaft notch.

9. An insulation stripping means as in claim 2 including a wire guiding means behind the insulation cutting jaws.

10. An insulation stripping means as in claim 2 including on the sleeve behind the insulation cutting jaw a projection defining a wire guiding notch in line with the longitudinal notch in said sleeve.

References Cited in the file of this patent

UNITED STATES PATENTS

| | | |
|---|---|---|
| 1,675,838 | Bernard | July 3, 1928 |
| 2,480,107 | Baldwin | Aug. 30, 1949 |